US012078967B2

(12) United States Patent
Humair et al.

(10) Patent No.: US 12,078,967 B2
(45) Date of Patent: Sep. 3, 2024

(54) MECHANISM FOR DISPLAYING THE NUMBER OF THE WEEK FOR A TIMEPIECE

(71) Applicant: PATEK PHILIPPE SA GENEVE, Geneva (CH)

(72) Inventors: Pascal Humair, Geneva (CH); Alvaro Hüssy, Rolle (CH)

(73) Assignee: PATEK PHILIPPE SA GENEVE, Geneva (CH)

( * ) Notice: Subject to any disclaimer, the term of this patent is extended or adjusted under 35 U.S.C. 154(b) by 471 days.

(21) Appl. No.: 17/435,949

(22) PCT Filed: Mar. 2, 2020

(86) PCT No.: PCT/IB2020/051749
§ 371 (c)(1),
(2) Date: Sep. 2, 2021

(87) PCT Pub. No.: WO2020/178708
PCT Pub. Date: Sep. 10, 2020

(65) Prior Publication Data

US 2022/0146984 A1 May 12, 2022

(30) Foreign Application Priority Data

Mar. 7, 2019 (EP) .................................... 19161236

(51) Int. Cl.
*G04B 19/24* (2006.01)
*G04B 19/02* (2006.01)

(52) U.S. Cl.
CPC .......... *G04B 19/241* (2013.01); *G04B 19/02* (2013.01)

(58) Field of Classification Search
CPC .................. G04B 19/02; G04B 19/241; G04B 19/253–19/25393
See application file for complete search history.

(56) References Cited

FOREIGN PATENT DOCUMENTS

| | | |
|---|---|---|
| CH | 682284 | 8/1993 |
| CH | 711 073 | 11/2016 |
| EP | 2 813 901 | 12/2014 |

OTHER PUBLICATIONS

Machine Translation of CN105549372 (Year: 2017).*
(Continued)

*Primary Examiner* — Edwin A. Leon
*Assistant Examiner* — Jason M Collins
(74) *Attorney, Agent, or Firm* — NIXON & VANDERHYE

(57) ABSTRACT

A mechanism for displaying the number of the week is fitted to a timepiece movement and includes a starwheel for the weeks including 52 or 53 teeth, and a rocker for the weeks including a flexible finger cooperating with the toothed arrangement of the weeks starwheel upon actuation of the rocker by a driving mobile. The driving mobile is driven by one step per day by the movement and to actuate the weeks rocker once every seven days upon passing from the last day of the week to the first. The driving mobile is a driving starwheel including seven teeth, six being silent teeth which are arranged not to cooperate with the weeks rocker and one tooth is a driving tooth arranged to actuate the rocker once per week upon passing from the last day of the week to the first day of the week.

20 Claims, 2 Drawing Sheets

(56) References Cited

OTHER PUBLICATIONS

Machine Translation of CH682284 (Year: 1993).*
Machine Translation of EP1729185 (Year: 2006).*
International Search Report and Written Opinion of the ISA for PCT/IB2020/051749 dated Jun. 9, 2020, 9 pages.

* cited by examiner

MECHANISM FOR DISPLAYING THE NUMBER OF THE WEEK FOR A TIMEPIECE

This application is the U.S. national phase of International Application No. PCT/IB2020/051749 filed Mar. 2, 2020 which designated the U.S. and claims priority to EP Patent Application No. 19161236.5 filed Mar. 7, 2019, the entire contents of each of which are hereby incorporated by reference.

BACKGROUND OF THE INVENTION

Field of the Invention

The present invention relates to a mechanism for displaying the number of the week intended to be fitted to a movement of a timepiece.

Description of the Related Art

In general, mechanisms for displaying the number of the week are arranged to drive a member for displaying the number of the week by one step per week upon passing from the last day of the week to the first day of the week. The displaying member is generally borne by a starwheel with 52 or 53 teeth, which thus makes $1/52^{nd}$ or $1/53^{rd}$ of a rotation each week. Since this angular travel is very small, it can be difficult to ensure that the function takes place accurately and precisely.

SUMMARY OF THE INVENTION

The aim of the present invention is thus to provide a mechanism for displaying the number of the week intended to be fitted to a movement of a timepiece which has a simple design but which can ensure that the function takes place accurately and precisely.

The present invention relates to a mechanism for displaying the number of the week as claimed in claim 1, as well as a movement for a timepiece as claimed in claim 12, and a timepiece as claimed in claim 13.

BRIEF DESCRIPTION OF THE DRAWINGS

The accompanying figures schematically show, by way of example only, one embodiment of a mechanism for displaying the number of the week in accordance with the invention.

DESCRIPTION OF THE PREFERRED EMBODIMENTS

Figure 1:
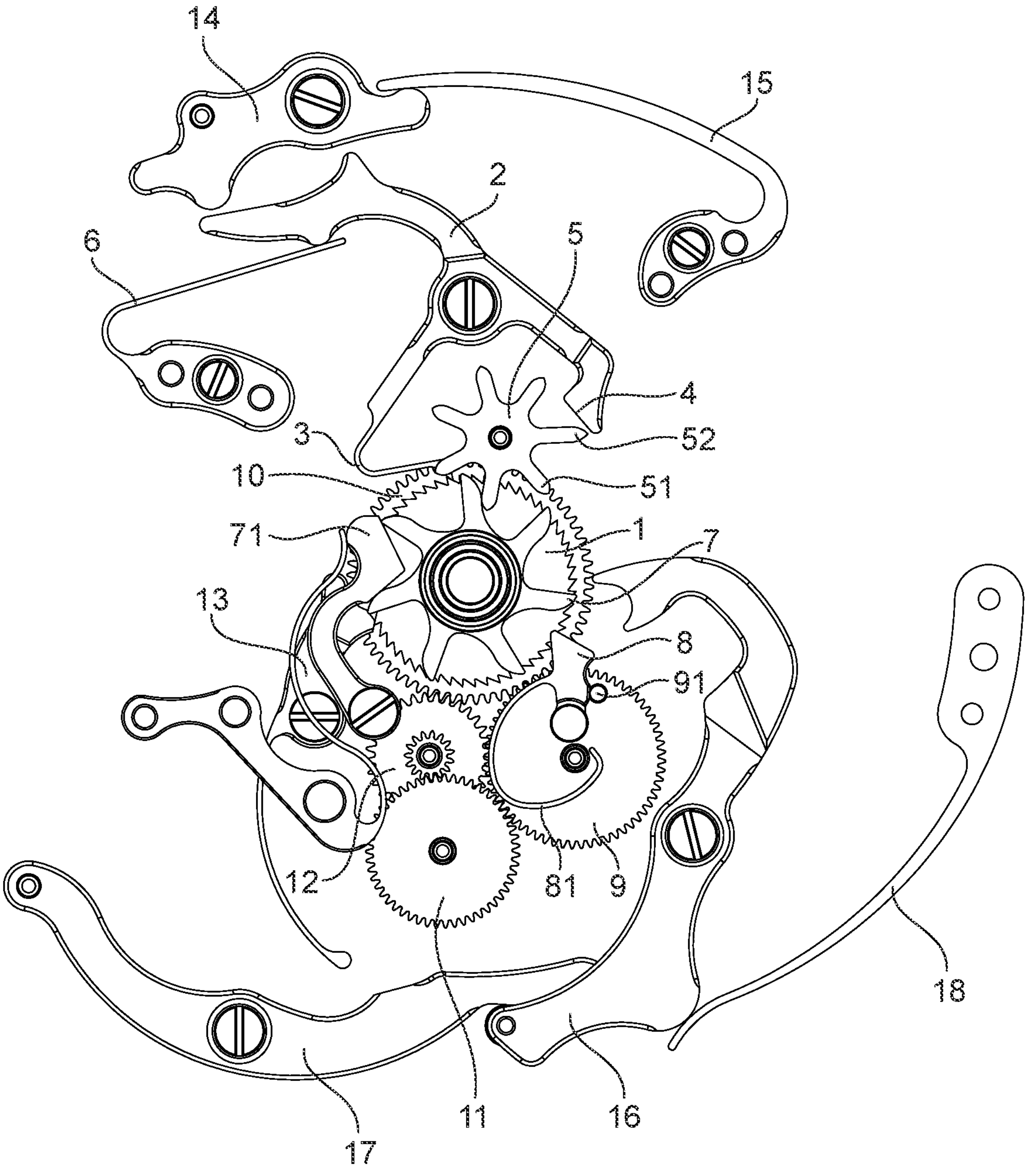
FIG. 1 illustrates the mechanism for displaying the number of the week in accordance with the invention during the last day of the week.
Figure 2:
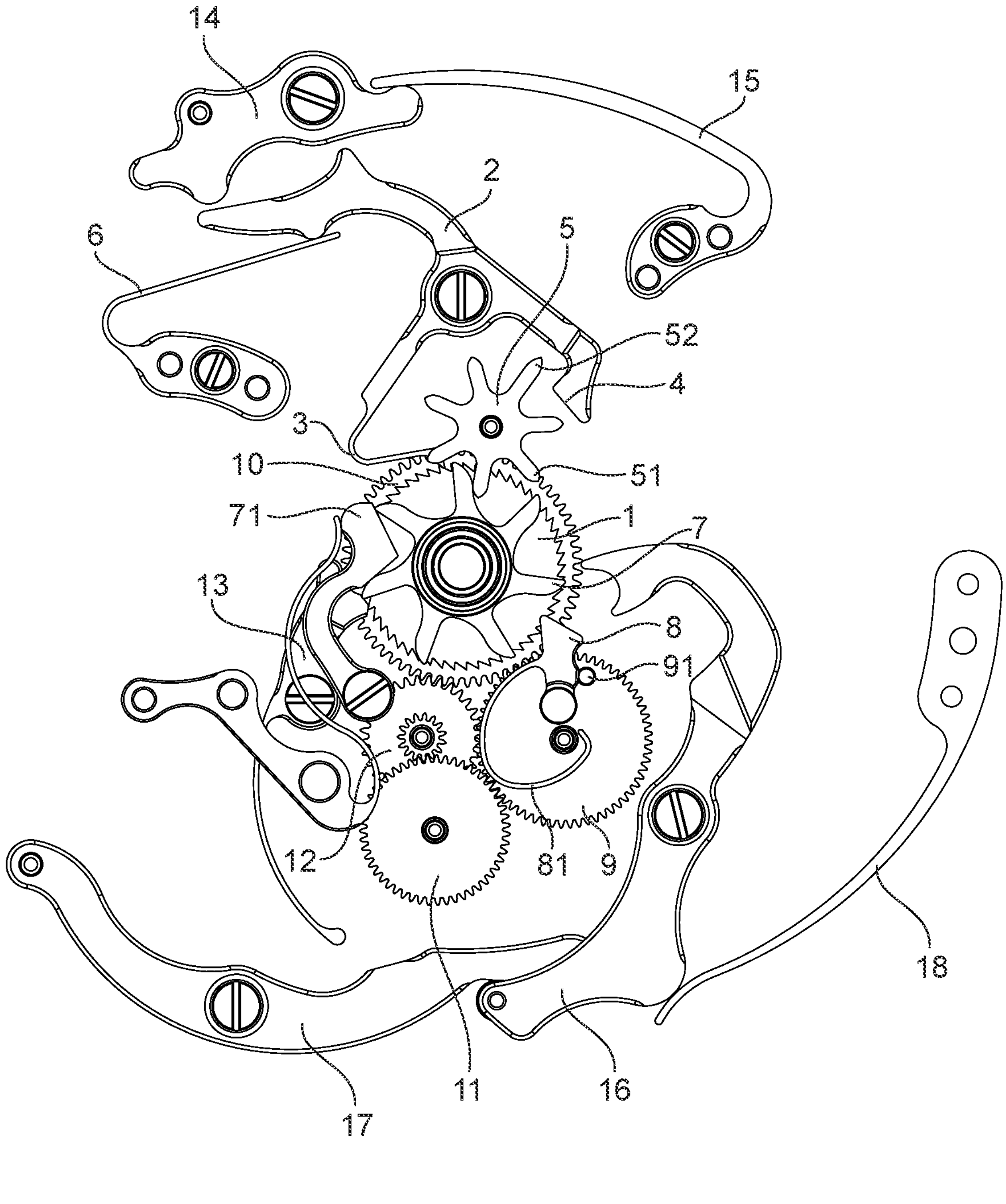
FIG. 2 illustrates the mechanism for displaying the number of the week in accordance with the invention during the first day of the week.

The mechanism for displaying the number of the week in accordance with the invention is intended to be fitted to a movement of a timepiece. It comprises a starwheel 1 for the weeks, comprising 53 teeth and bearing a member for displaying the number of the week, preferably a hand (not shown). The member for displaying the number of the week can particularly cooperate with a scale comprising 53 numbers and is arranged to advance by one step each week upon passing from the last day of the week to the first day of the following week.

Hereinafter, the last day of the week is considered to be Sunday, and the first day of the week is considered to be Monday (which corresponds to the standard ISO 8601 for numbering the days of the week). Of course, other choices are possible (the week begins on a Sunday in some countries and cultures, such as in the Jewish calendar for example).

The weeks starwheel 1 is driven by one step ($1/53^{rd}$ of a rotation) per week by a rocker 2 for the weeks pivoted on a bridge or plate of the movement. The weeks rocker 2 comprises a flexible finger 3 arranged to cooperate with the toothing of the weeks starwheel 1 when the weeks rocker 2 pivots. Preferably, the flexible finger 3 and the weeks rocker 2 are made from one piece. A jumper 13 for the weeks guarantees the positioning and angular displacement of the weeks starwheel 1.

The weeks rocker 2 further comprises an active end 4, in the shape of an inclined plane in the illustrated embodiment, and intended to cooperate with a driving starwheel 5. Finally, the weeks rocker 2 is subject to the action of a return spring 6.

The driving starwheel 5 is arranged to make one rotation per week. To this end, it can be connected to the movement of the timepiece by an appropriate kinematic chain. The driving starwheel 5 is likewise arranged to cooperate with the active end 4 of the weeks rocker 2 once per week, upon passing from Sunday to Monday, in order to cause said weeks rocker 2 to pivot against the action of its return spring 6 and thereby to cause the weeks starwheel 1 to be pivoted by one step via the flexible finger 3 of the rocker 2.

In accordance with the invention, the driving starwheel 5 comprises seven teeth, six teeth of which are referred to as silent teeth 51 corresponding to days 1 to 6 of the week (Monday to Saturday) and are arranged not to cooperate with the active end 4 of the weeks rocker 2. Only the seventh tooth, referred to as drive tooth 52, is arranged to cooperate with the active end 4 of the weeks rocker 2 to cause said rocker 2 to pivot and thus cause the weeks starwheel 1 to advance by one step. Preferably, the six silent teeth 51 have the same size (sufficiently short not to be in the path of the active end 4 of the weeks rocker 2) whilst the drive tooth 52 is longer in order to be able to actuate the active end 4 of the weeks rocker 2.

Owing to this driving starwheel 5 and its particular shape, it is possible to easily and effectively manage a very small angular travel of the weeks rocker 2.

In the illustrated embodiment, the mechanism for displaying the number of the week cooperates with a mechanism for displaying the day of the week. In particular, the driving starwheel 5 is driven by one step per day by a starwheel 7 for the days, comprising seven teeth arranged to cooperate both with the silent teeth 51 and the drive tooth 52 of the driving starwheel 5.

The days starwheel 7 is driven by one step per day upon passing through midnight, or approximately midnight, by a finger 8 for the days mounted on a driving wheel 9, itself driven at a rate of one rotation per day by the movement of the timepiece. In the illustrated embodiment, the driving wheel 9 is connected to the wheel 10 for the hours of the movement via a setting wheel 11 and an intermediate wheel 12.

The days starwheel 7 preferably bears a member for displaying the days of the week (not shown), e.g. a hand. The positioning and displacement of the days starwheel 7 are ensured by a jumper 71 for the days.

Preferably, the days finger 8 is arranged to be disengageable, i.e. it is driven by the driving wheel 9 and actuates the days starwheel 7 when the driving wheel 9 rotates in a first direction (the anti-clockwise direction in the figures) but does not actuate said days starwheel 7 when the driving wheel 9 rotates in a second direction (reverse hand-setting). Traditionally, in order for such a days finger to be disengageable it is mounted in a pivoting manner on the driving wheel, cooperates with a pin driven into said driving wheel and is subject to the action of a return spring. Said return spring is fixed at one of its ends to the driving wheel whilst its other end cooperates with the days finger. The return spring is generally fixed to the wheel using two pins surrounding a screw. However, the fixing and guiding of the return spring on the wheel are often problematic, particularly given the small thickness of the wheel which means that it is not always possible to ensure sufficient axial holding of the pins nor a thread with a sufficient number of turns to hold the screw.

In order to solve this problem, in the illustrated embodiment the days finger 8 is mounted in a pivoting manner on the driving wheel 9 and comprises a return strip 81 which is of one piece with, or assembled with, said days finger 8. The days finger 8 cooperates with a pin 91 fixed on the driving wheel 9 such that, when said driving wheel 9 pivots in a first direction, the anti-clockwise direction in the figures, the pin 91 comes to abut against the days finger 8 and drives it, which cooperates with the days starwheel 7 to cause it to advance step by step. The return strip 81 is shaped such that, when the driving wheel 9 rotates in a second direction (the clockwise direction in the figures), the return strip 81 comes to cooperate with the pin 91 such that the days finger 8 coming into contact with a tooth of the days starwheel 7 pivots under the action of its return strip 81 without driving said days starwheel 7 whilst staying in a position in which it can resume driving the days starwheel 7, i.e. return to being in abutment against the pin 91 when the driving wheel 9 resumes its rotation in the first direction.

With the days finger 8 in accordance with the present embodiment, manufacturing of the driving wheel 9 is simplified and mounting of the days finger 8 on the driving wheel 9 is facilitated, whilst ensuring the disengaging function of the days finger 8.

In the illustrated embodiment, the mechanism for displaying the number of the week further comprises a device for correcting the number of the week which can be actuated by a user and comprises a lever 14 for correcting the weeks associated with a return spring 15 and arranged to actuate the weeks rocker 2 and thereby cause the weeks starwheel 1 to advance step by step upon request by a user. The weeks rocker 2, in particular its active end 4, as well as the lever 14 for correcting the weeks are arranged such that, when the weeks rocker 2 is actuated by the lever 14 for correcting the weeks, it does not actuate the driving starwheel 5.

The mechanism for displaying the day of the week likewise preferably comprises a device for correcting the day of the week which can be actuated by a user and comprises a corrector 16 for the days controlled by a lever 17 and subject to the action of a return spring 18. The days corrector 16 is arranged to actuate the days starwheel 7 step by step upon request by a user. During such a correction of the day of the week, the rotation of the days starwheel 7 does not drive the driving wheel 9 since the days finger 8 is disengageable (i.e. the days finger 8 comes to pivot against the action of its return strip 81 into a position in which it is no longer in abutment against the pin 91). In the illustrated embodiment, the days corrector 16 is likewise arranged to cause the days finger 8 to pivot out of the path of the days starwheel 7 when, during the correction of the day of the week, the relative position of the days finger 8 and of the days starwheel 7 could lead to a butting position between said finger 8 and a tooth of said starwheel 7. Therefore, the days corrector 16 enables optimum operation to be ensured and any butting position between the days finger 8 and a tooth of the days starwheel 7 to be avoided, which butting position could lead to jamming or breaking of the mechanism.

As a variant, the weeks starwheel 1 could comprise only 52 teeth: since years with 53 weeks are very rare, the need to correct the number of the week every year which has 52 weeks is thus obviated, leaving simply the need to make a correction during the rare years with 53 weeks.

In general, the mechanism for displaying the number of the week in accordance with the invention comprises a weeks starwheel comprising 52 or 53 teeth and intended to bear a member for displaying the number of the week, a weeks rocker comprising a flexible finger arranged to cooperate with the toothing of the weeks starwheel, and a driving mobile arranged to be driven by one step per day and to actuate the weeks rocker once every seven days upon passing from the last day of the week to the first day of the week, the flexible finger of said weeks rocker thus cooperating with the toothing of the weeks starwheel to cause same to advance by one step. In accordance with the invention, the driving mobile is a driving starwheel comprising seven teeth, six of which are silent teeth which are arranged not to cooperate with the weeks rocker, and one tooth of which is a driving tooth arranged to cooperate with said rocker once a week.

Preferably, the six silent teeth are the same length and the driving tooth is longer than said silent teeth.

Preferably, the flexible finger of the weeks rocker is made in one piece with said rocker.

Preferably, the driving starwheel is driven by a days starwheel comprising seven teeth arranged to cooperate with the silent teeth and the driving tooth of the driving starwheel, able to be caused to rotate by one step per day, and subject to the action of a days jumper to ensure its angular positioning.

Other alternatives for driving the driving starwheel are possible: for example, the driving starwheel could be driven by a finger arranged to make one rotation per day. A starwheel with seven teeth mounted fixedly attached to, and coaxial with, the driving starwheel and subject to the action of a jumper could be arranged to allow the angular positioning of the driving starwheel to be ensured.

A mechanism for displaying the number of the week is thus produced which has a simple design but which allows accurate and precise operation despite the small angular travel of the weeks rocker and its flexible finger. In addition, the mechanism is readily associated with a mechanism for displaying the day of the week as well as conventional correcting devices.

As a variant, it is possible to adapt the displaying mechanism as described above to allow the display of other information, such as the month.

The invention claimed is:

1. A mechanism for displaying a number of a week intended to be fitted to a movement of a timepiece and comprising a weeks starwheel comprising 52 or 53 teeth, a rocker comprising a flexible finger arranged to cooperate with toothing of the weeks starwheel upon actuation of said rocker by a driving mobile, said driving mobile being arranged to be driven by one step per day by the movement of the timepiece and to actuate the rocker once every seven days upon passing from the last day of the week to the first day of the week, wherein the driving mobile is a driving starwheel comprising seven teeth, of which six teeth are silent teeth which are arranged not to cooperate with the rocker and one tooth is a driving tooth arranged to actuate said rocker once per week upon passing from the last day of the week to the first day of the week.

2. The mechanism as claimed in claim 1, further comprising a starwheel with seven teeth subject to action of a jumper and arranged to cooperate with the driving starwheel to ensure angular positioning thereof.

3. The mechanism as claimed in claim 2, wherein the starwheel with seven teeth is mounted fixedly attached to, and coaxial with, the driving starwheel.

4. The mechanism as claimed in claim 3, further comprising a days starwheel able to be caused to rotate by one step per day by the movement of the timepiece, and subject to the action of a days jumper to ensure the days starwheel's angular positioning, the days starwheel comprising seven teeth arranged to cooperate with the silent teeth and the driving tooth of the driving starwheel for driving the driving tooth of the driving starwheel by one step per day.

5. The mechanism as claimed in claim 3, wherein the six silent teeth of the driving starwheel are the same length, and wherein the driving tooth is longer than said silent teeth.

6. The mechanism as claimed in claim 2, further comprising a days starwheel able to be caused to rotate by one step per day by the movement of the timepiece, and subject to the action of a days jumper to ensure the days starwheel's angular positioning, the days starwheel comprising seven teeth arranged to cooperate with the silent teeth and the driving tooth of the driving starwheel for driving the driving tooth of the driving starwheel by one step per day.

7. The mechanism as claimed in claim 2, wherein the six silent teeth of the driving starwheel are the same length, and wherein the driving tooth is longer than said silent teeth.

8. The mechanism as claimed in claim 2, wherein the flexible finger of the rocker is made in one piece with said rocker.

9. The mechanism as claimed in claim 1, further comprising a days starwheel able to be caused to rotate by one step per day by the movement of the timepiece, and subject to action of a days jumper to ensure the days starwheel's angular positioning, the days starwheel comprising seven teeth arranged to cooperate with the silent teeth and the driving tooth of the driving starwheel for driving the driving tooth of the driving starwheel by one step per day.

10. The mechanism as claimed in claim 9, wherein the days starwheel is driven by one step per day by a days finger borne by a driving wheel able to be driven at a rate of one rotation per day by the movement of the timepiece.

11. The mechanism as claimed in claim 10, wherein the days finger is arranged to be disengageable, by actuating the days starwheel and causing the days starwheel to advance by one step when the driving wheel rotates in a first direction, but does not actuate said days starwheel when the driving wheel rotates in a second direction.

12. The mechanism as claimed in claim 11, wherein the days finger is arranged to cooperate with a pin fixed in the driving wheel such that, when the driving wheel rotates in a first direction, said days finger abuts against the pin in a position in which the days finger can actuate the days starwheel; and wherein the days finger comprises a return strip which is of one piece with, or assembled with, said days finger and is shaped such that, when the driving wheel rotates in a second direction, the return strip cooperates with the pin such that the days finger—coming into contact with one tooth of the days starwheel—pivots under the action of the return strip without driving said days starwheel whilst staying in a position in which the days finger can resume driving of the days starwheel, and thus the days finger's position in abutment against the pin, when the driving wheel resumes the rotation in the first direction.

13. The mechanism as claimed in claim 9, wherein the six silent teeth of the driving starwheel are the same length, and wherein the driving tooth is longer than said silent teeth.

14. The mechanism as claimed in claim 1, wherein the six silent teeth of the driving starwheel are the same length, and wherein the driving tooth is longer than said silent teeth.

15. The mechanism as claimed in claim 1, wherein the flexible finger of the rocker is made in one piece with said rocker.

16. The mechanism as claimed in claim 1, wherein an active end of the rocker cooperating with the driving tooth of the driving starwheel has a shape of an inclined plane.

17. The mechanism as claimed in claim 1, further comprising a member for displaying the number of the week, borne by the weeks starwheel.

18. The mechanism of claim 17, wherein the member for displaying the number of the week is a hand.

19. A movement for a timepiece comprising a mechanism for displaying the number of the week as claimed in claim 1.

20. A timepiece comprising a movement as claimed in claim 19.

* * * * *